United States Patent
Mathers

(10) Patent No.: US 6,578,527 B1
(45) Date of Patent: Jun. 17, 2003

(54) SOUND GENERATING PET TOY

(76) Inventor: Diana Mathers, Box 8, 1316 Camino del Sol, San Marco, CA (US) 92069

(*) Notice: Subject to any disclaimer, the term of this patent is extended or adjusted under 35 U.S.C. 154(b) by 0 days.

(21) Appl. No.: 10/075,934

(22) Filed: Feb. 13, 2002

Related U.S. Application Data

(60) Provisional application No. 60/268,168, filed on Feb. 13, 2001.

(51) Int. Cl.$^7$ .......................... A01K 29/00; A63H 17/32
(52) U.S. Cl. .......................... 119/707; 446/175; 446/409
(58) Field of Search .................... 119/707, 702, 119/709, 708, 710, 711; 446/175, 431, 397, 409

(56) References Cited

U.S. PATENT DOCUMENTS

| | | | | | |
|---|---|---|---|---|---|
| 2,003,957 A | * | 6/1935 | Salisbury | ...................... | 446/409 |
| 4,314,423 A | * | 2/1982 | Lipsitz et al. | ............. | 430/384.3 |
| D287,988 S | * | 1/1987 | Billinghurst | ............... | D21/468 |
| 4,659,919 A | * | 4/1987 | Price | .......................... | 250/206 |
| 4,662,260 A | * | 5/1987 | Rumsey | ...................... | 446/408 |
| 4,757,491 A | * | 7/1988 | Koike | ......................... | 250/221 |
| 4,867,726 A | * | 9/1989 | Fujimaki | ..................... | 446/175 |
| 5,221,225 A | * | 6/1993 | Newbold et al. | ........... | 446/297 |
| 5,281,180 A | * | 1/1994 | Lam et al. | .................. | 446/175 |
| 5,390,629 A | * | 2/1995 | Simone | ....................... | 119/711 |
| 5,533,920 A | * | 7/1996 | Arad et al. | ................. | 446/409 |
| 6,098,571 A | * | 8/2000 | Axelrod et al. | ............. | 119/707 |
| 6,139,394 A | * | 10/2000 | Maxim | ........................ | 446/219 |
| 6,215,978 B1 | * | 4/2001 | Ruzic et al. | ............ | 273/153 R |
| 6,378,634 B1 | * | 4/2002 | Yim | .......................... | 180/65.1 |
| 6,416,381 B1 | * | 7/2002 | Walter et al. | ............... | 446/397 |

* cited by examiner

Primary Examiner—Yvonne Abbott
(74) Attorney, Agent, or Firm—Roger A. Marrs

(57) ABSTRACT

A pet toy capable of being moved or rollably deployed about the floor or room or which may be hung from a support as a swingable toy. A housing is provided having an audible sound generator with vents through which sound or light is conducted so as to be sensed by a sensor for actuation of the sound generation. A diaphragm receives motion airwaves, while a photo-electric cell carried on the housing receives light waves. The sound generating device is included in an interior housing along with the sensor and is mounted on a platform. Audio wave generation is conducted from a loudspeaker through the interior of the housing for exiting through the vents.

2 Claims, 1 Drawing Sheet

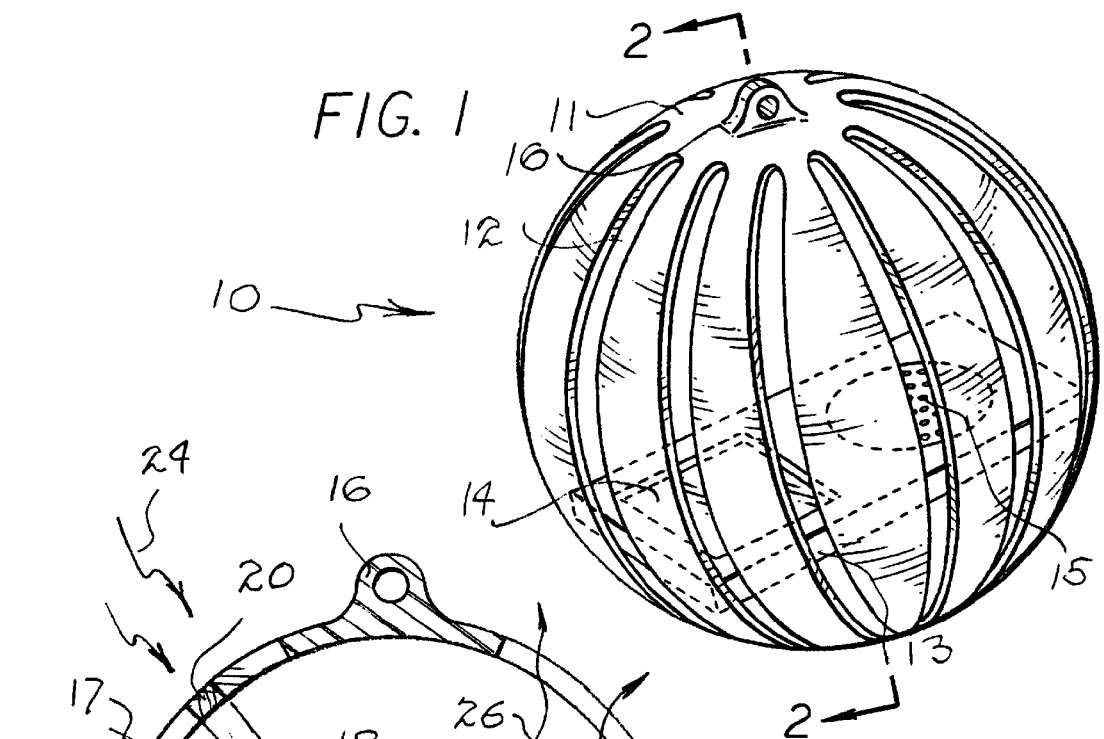
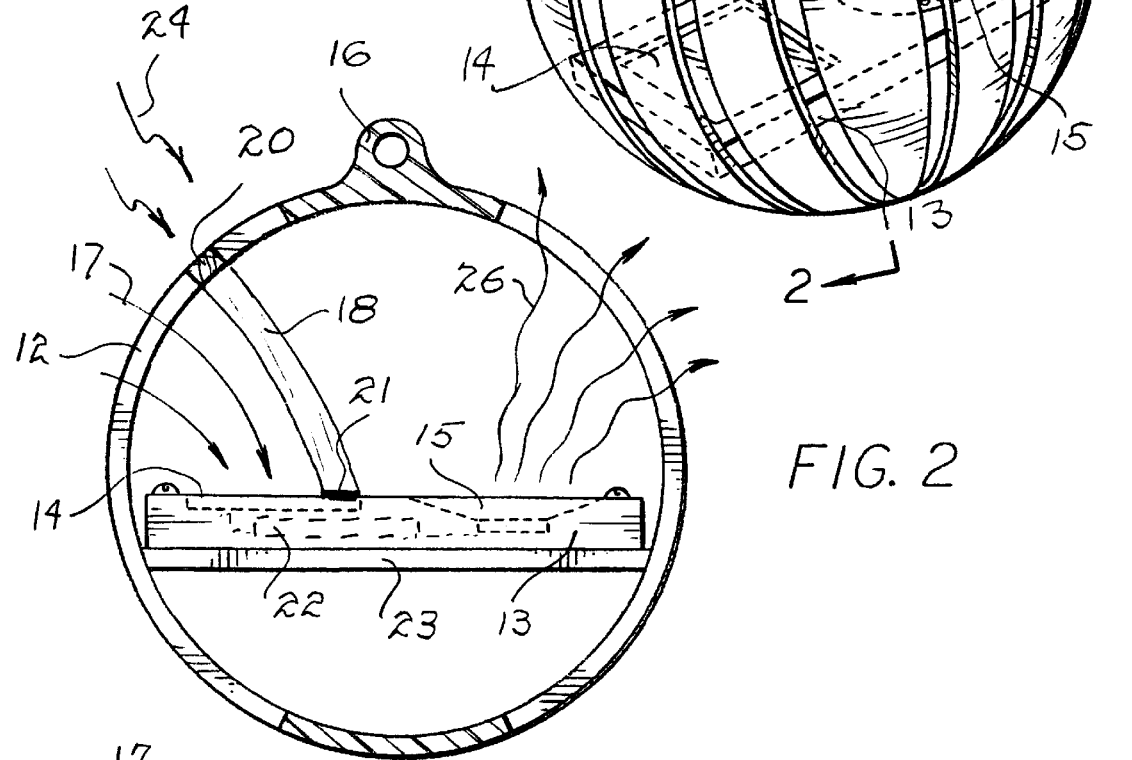
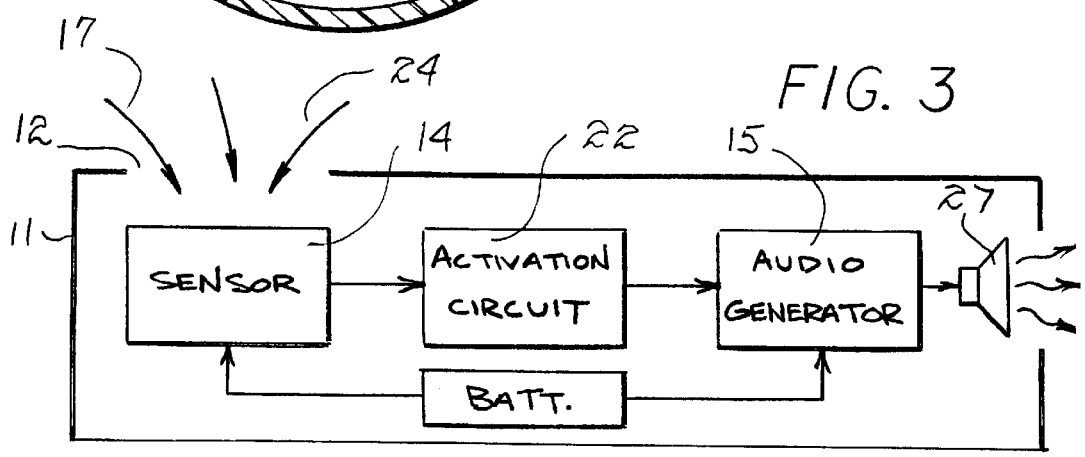

SOUND GENERATING PET TOY

This application claims the benefit of Ser. No. 60/268,168 filed Feb. 13, 2001.

BACKGROUND OF THE INVENTION

1. Field of the Invention

The present invention relates to the field of pet amusing and exercising devices and more particularly to a novel movable pet toy which is responsive to light and/or sound waves for actuating an audio generator.

2. Brief Description of the Prior Art

In the past, it has been the conventional practice to provide a movable toy for pets such as a ball or the like which when moving will attract the attention and interest of a pet. In some situations, noise making devices have been placed inside the toy which again have attracting and attention characteristics for attracting the attention of a pet.

Problems and difficulties have been encountered with such conventional pet toys which stem largely from the fact that the audio generator used for producing a variety of sounds or messages is usually actuated by means of the pet owner pulling a string or cord or by manually winding the audio generating mechanism preparatory for play with the pet. Also, attempts have been made to place noise generating devices in the toy so that when shaken, squeezed or rolled it will be responsive to the physical action to generate a noise, message or the like. Such devices are expensive since it is uneconomical to manufacture these devices because of the assembly necessary by skilled workers. Also, many expensive parts are employed and, in some instances, maintenance and repairs are required.

Therefore, a long-standing need has existed to provide a sound or noise making toy having a sound generator which is actuated by either sound waves or light waves and that may be readily mounted in a pet toy adapted to be moved about as a play toy by a pet.

SUMMARY OF THE INVENTION

Accordingly, the above problems and difficulties are avoided by the present invention which provides a novel pet toy capable of being moved or rollably deployed about the floor or room or which may be hung from a support as a swingable toy. In one form of the invention, a housing is provided having an audible sound generator on the inside of the housing. The housing is provided with vents or apertures through which sound or light is conducted so as to be sensed by a sensor for actuation of the sound generation. For receiving motion airwave conduction, the sensor may be a diaphragm, while a photo-electric cell may be carried on a tube and having a lens exposed exteriorly of the housing through a vent or opening for receiving light waves. The sound generating means is included in an interior housing along with the sensor and can be mounted on a platform or frame of the housing so as to be carried therewith. Audio wave generation is conducted from a loudspeaker through the interior of the housing for exit through the vents or openings in the housing.

The housing can be adapted to include an eyelet so that a string or hanger can be attached so that the housing will swing and the movement will be attractive and amusing to a pet. Preferably, the housing is spherical shaped so that it will roll on the floor or the ground and, in a similar fashion, be attractive to a pet. The vents or openings are disposed so as to permit entrance of sound or light waves and exit of audio sound waves regardless of the attitude or deployment of the device. Furthermore, it is expected that the housing be of a smaller size than conventional pet toys having audio sound generation so that small animals, such as cats or the like, can enjoy play.

Preferably, the housing is soft and pliable and permits visual observation of the interior in event that food, treats or the like, are contained therein. Such treats may include attractive smelling articles, as well as chewable treats. The housing may be provided with an opening so that the pet or animal may have access to such treats. A feature of the audio generator resides in providing a timer for not only automatic actuation but for length of time, and the light sensor is derived from exterior motion whereby light beams form shadows which pass over the light sensor.

A special recording is provided on the sound generating means so that special scripts, noises, or other audio signals can be generated in response to the sensing of changes in motion waves or light waves.

Therefore, it is among the primary objects of the present invention to provide a novel, movable pet toy that includes an audible generating means responsive to changes in light patterns, motion waves and which includes a sensor and audio generating means carried in a unitary construction within a vented or open housing.

Still another object of the present invention is to provide a novel pet toy having a sound generating means responsive to changes in light or motion changes external of the toy which are sensed and employed to actuate the audio generating means.

Yet another object resides in providing special scripts, noises, and sounds on the sound generating means which is activated by changes in shadow dispositions over a sensor.

A further object resides in providing a housing for a pet toy which encloses a sensor for motion and light changes which are used to activate a sound generating means wherein the housing is soft and pliable and is of a small size and has the ability of housing special pet attraction items, such as treats or the like.

Still a further object resides in providing a pet toy which is impact sensitive so that the various actuating and sensing mechanisms used in the recording or sound generation means are not adversely affected.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

FIG. 1 is a front perspective view illustrating the novel pet toy incorporating the present invention;

FIG. 2 is a transverse, cross-sectional view of the pet toy shown in FIG. 1 as taken in the direction of arrows 2—2 thereof; and FIG. 3 is a block diagram illustrating the circuit for sensing light or motion waves and actuating a sound audio generator in response thereto.

DESCRIPTION OF PREFERRED EMBODIMENT

Referring to FIG. 1, the novel pet toy is indicated in the general direction of arrow 10 which includes a housing 11 having a spherical wall with a plurality of openings, slots, or vents as indicated by numeral 12. The interior is hollow and is occupied by a unitary construction having an enclosure 13 for a sensor unit 14 and a noise or audible generating means 15. Preferably, the housing is spherical so that the toy will roll or move about the floor as an animal is either attracted to the movement or can play with the toy itself. The top of the enclosure may include an eyelet 16 to which a hanger, string, cord or the like may be attached.

It is to be particularly noted that the enclosed sensor 14 and noise generator 15 is a complete unit which is conventionally available and includes the necessary circuitry, power source, and the like in order to produce the audible sound in response to signals from the sensor 14.

Referring now in detail to FIG. 2, it can be seen that the sensor 14 is responsive to changes in movement, represented by the arrow 17, while the sensor 14 is also coupled to the end of a light transmitting tube 18 which includes a lens 20. A photo cell may be included at the opposite end of the tube represented by numeral 21, which is operably coupled to the circuitry of the sensor 14. The circuitry is represented by the numeral 22 which may include a battery and necessary amplifying circuits. The circuitry may be considered an actuation circuit which is coupled to the noise generating means 15 that may take the form of a loudspeaker with suitable amplifying circuitry. The housing 13 for the sensor and noise making means may be fixly carried to a platform or support 23 wherein the opposite ends of the support are fixly carried to the interior wall surface of the housing.

Variations in light beam radiation such as produced by shadows or the like are indicated by the arrow 24 and are conducted to the sensor 14 in the same manner as the motion waves 17. Upon receipt of variations in the wave motions, or the light motion caused by shadows, the sensor 22 will be applied to an activation circuit 22 and hence to the noise generating means 15. The audible sound from the generating means is indicated by the arrow 26 and radiates from the interior of the housing through the vents or openings 12 into the environment.

Referring now to FIG. 3, it can be seen that the various wave radiations enter the housing 11 through the openings 12 and are received by the sensor 14 which emits signals to the activating circuit for initiating response in the audio generator. The generator 15 may include a loud speaker 27 and the audible sound is emitted through the openings in the housing 11 to the external environment.

In view of the foregoing, it can be seen that the novel pet toy incorporating the present invention provides an amusing and exercising device for pets. The sound maker or audio generator 15 is responsive to actuation by the sensor when shadows or light variations are picked up and/or wave motions are sensed. The user has the capability of putting "treats" into the hollow interior of the housing and the housing may be hung on the inside of a cage or from a support by means of the eyelet 16. The sensor is either light or motion sensitive and the pick up for the sensor is pointed at the opening in the housing. The light tube may be of light conducting material, such as fiber optics or the like. An amplifying lens may be employed in order to augment the signal for more effective response by the sensor. The actuating circuit may include a timer as well as the power source, such as a battery, so that a timed limit is placed on the generation of the audio sound. The timer may permit intermittant sound generation or sound generation for a certain period of time only. A feature of the audio sound generator 15 resides in providing a recording means having special script noises, messages, sounds or the like.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A pet toy comprising:
   a housing having a spherical wall defining an interior compartment and said wall provided with a plurality of openings;
   a sensor disposed in said housing interior compartment for detecting changes in motion and light beam radiation;
   a sound generating means carried in said housing interior compartment responsive to changes in motion or light beam waves to produce an audio sound;
   said sound generation means including a pre-recorded means containing a storage of sounds identifiable with amusement of an animal as well as for systemic reduction of enxiety by providing said audio sounds which are soothing and affectionate;
   circuit means within said housing coupling said sensor with said sound generation means;
   an enclosure mounted within said housing interior compartment combining said sensor and said sound generation means to define a unitary construction;
   said openings in said wall arranged in fixed spaced-apart relationship to provide for passage of motion or light beamswaves to travel to said sensor and for passage of said audio sound from said sound generation means;
   a mounting platform disposed in said housing interior compartment for supporting said unitary construction; and
   said housing having an exterior eyelet integrally provided on said spherical wall to accommodate hangable mounting.

2. A pet toy for producing an audible sound in response to either movement wave energy or light wave energy variations comprising:
   a ball-shaped housing having a hollow interior defined by an inner wall surface of a spherical wall;
   said wall having a plurality of openings in fixed spaced-apart relationship separated by a plurality of segments arranged in said wall;
   a platform disposed in said hollow interior having opposite ends thereof fixed to said inner wall surface;
   an energy wave sensor and a sound generator means combined in a unitary construction;
   said unitary construction secured to said platform with said sensor facing a selected one of said openings;
   said sound generator means being responsive to energy wave disturbances by said sensor to produce an audible sound propagated through said openings;
   said energy wave sensor is responsive to environmental disturbances involving atmospheric or light variations;
   said openings are elongated slots provided in said wall; and
   said sound generation means including a pre-recorded means containing a storage of sounds identifiable with amusement of an animal as well as for systematic reduction of anxiety by providing said audio sounds which are soothing and affectionate.

* * * * *